United States Patent [19]
Badger et al.

[11] 4,376,315
[45] Mar. 15, 1983

[54] VACUUM FLUSH VALVE

[75] Inventors: Everett H. Badger, Irvine; Michael J. Rogerson, Newport Beach, both of Calif.

[73] Assignee: Rogerson Aircraft Controls, Irvine, Calif.

[21] Appl. No.: 278,259

[22] Filed: Jun. 29, 1981

Related U.S. Application Data

[62] Division of Ser. No. 68,131, Aug. 20, 1979, Pat. No. 4,275,470.

[51] Int. Cl.$^3$ .............................................. E03D 11/00
[52] U.S. Cl. .......................................... 4/431; 4/316; 4/378; 4/380; 251/61.1; 251/5
[58] Field of Search ................... 4/431, 316, 318, 415, 4/319, DIG. 11, 378, 423, 422, 421, 380, 426, 432, 433; 251/61.1, 5

[56] References Cited

U.S. PATENT DOCUMENTS

| | | | |
|---|---|---|---|
| 2,749,558 | 6/1956 | Lent et al. | 4/316 |
| 3,034,131 | 5/1962 | Lent | 4/316 X |
| 3,083,943 | 4/1963 | Stewart, Jr. et al. | 251/61.1 |
| 3,100,002 | 8/1963 | Moore | 251/61.1 |
| 3,329,974 | 7/1967 | Balasco | 4/316 |
| 3,340,543 | 9/1967 | Cella | 4/316 |
| 3,340,544 | 9/1967 | Cella | 4/316 |
| 3,350,053 | 10/1967 | Schmitz | 251/5 |
| 3,482,267 | 12/1969 | Liljendahl | 4/431 |
| 3,663,970 | 5/1972 | Drouhard, Jr. et al. | 4/319 |
| 3,720,962 | 3/1973 | Harrah | 4/415 |
| 3,922,730 | 12/1975 | Kemper | 4/318 |
| 3,950,249 | 4/1976 | Egar et al. | 4/318 X |
| 3,974,528 | 8/1976 | Claunch et al. | 4/DIG. 11 X |
| 3,995,328 | 12/1976 | Carolan et al. | 4/316 |
| 4,063,315 | 12/1977 | Carolan et al. | 4/316 |

*Primary Examiner*—Henry K. Artis
*Attorney, Agent, or Firm*—Whann & McManigal

[57] ABSTRACT

A flexible valve element in the form of a flexible diaphragm movable between open and closed positions for opening or closing the drain. By operation of a control pressure chamber formed over the outer or exterior side of the diaphragm and which operates directly by application or pressure or vacuum to the same to move the diaphragm between the open and closed position. A control valve provides the connection from the control chamber to the passenger cabin to provide operating pressure for closing the valve and is alternatively connectable to an accumulator which stores vacuum normally supplied from a source such as that applied to the downstream side of the drain. The control valve is preferably operated by a solenoid which responds to an electrical signal. A manual override system is provided for closing the valve by hand. The invention finds particular application as a valve for use in a non-circulatory vacuum-operated waste disposal system for passenger conveyances such as aircraft in which a toilet bowl is connected to a vacuum-waste holding tank by a drain connected to the bowl and incorporating a valve.

19 Claims, 11 Drawing Figures

VACUUM FLUSH VALVE

CROSS-REFERENCE TO RELATED APPLICATIONS

Cross-reference is made to our co-pending U.S. patent application entitled "VACUUM-FLUSH TOILET ARRANGEMENT FOR AIRCRAFT", Ser. No. 068,131, filed Aug. 20, 1979, now U.S. Pat. No. 4,275,470, of which this application is a Divisional application.

INTRODUCTION

The present invention relates to a pressure operated valve for controlling a flow of liquid or gas through a pipe or other conduit. The valve of our invention has a particular utility in a waste disposal system for use in airplanes, which system is disclosed in our parent application Ser. No. 068,131, filed Aug. 20, 1979, now U.S. Pat. No. 4,275,470.

SUMMARY OF THE INVENTION

The present invention relates to a valve construction and operation of a new vaccum-flush toilet disclosed in the cross-referenced application and is particularly directed to a valve sub-combination and control module of the vacuum-flush toilet which is operated by a relatively small amount of fresh water and a vacuum pressure differential created by the aircraft environment or auxilliary vacuum pump, which together with ambient cabin pressure provides the motive force to convey waste to a modularized holding tank system.

BACKGROUND OF THE INVENTION

Although the valve of our invention was designed particularly for use in aircraft it can be used wherever vacuum and pressure sources are available for operating the parts of the valve to move the valve element or closure member between open and closed positions.

OBJECTS OF THE INVENTION

It is an object of the invention to provide a vacuum-operated valve for use in a vacuum-pressure flush toilet waste system of the type usable in aircraft and the like.

Another object of the invention is to provide a vacuum-pressure operated valve of the above character having internal operating parts requiring no actuating motors so that the entire valve opening and closing sequence can be controlled by the use of pressure or vacuum by a simple electrical signal which may be provided by a motor-driven timer.

It is a further object of the invention to provide a valve of the above character which is uniquely simple in construction which contains a single major operating component together with control valves, namely a flexible diaphragm or other conduit operating to close through an opening in a section of pipe, the diaphragm conforming to the interior of the pipe wall to seal the same and divide the pipe into separate sections thereat, the diaphragm being operated directly by the combination of a pressure and vacuum differential across its surface.

It is a further object of the invention to provide a valve of the above character which is protected when the valve is in a closed position so that it will continue to function irrespective of whether or not parts of the system made from plastic material are destroyed or deformed.

As used herein in the specification and claims, the terms "vacuum" and "pressure" are intended to be relative. Where the term "pressure" is used, it refers to a pressure which may be imposed on a control chamber of the valve from an accumulator to close the valve. In the form of the invention shown and described in this application, the pressure is cabin pressure. The term "vacuum" refers to a vacuum or any lesser pressure that is imposed on the valve. This vacuum referred to which, when imposed on the control chamber, however, will cause the vacuum to open the diaphragm, i.e., to pull away from a closed position even when the same vacuum is applied on the drain side of the diaphragm.

BRIEF DESCRIPTION OF THE DRAWINGS

FIG. 1A is an enlarged cross-sectional view taken within the lines A—A of FIG. 1 showing details of the check valve portion of the valve control mechanism and a bi-metal safety valve, operable in case of fire.

DETAILED DESCRIPTION OF THE PREFERRED EMBODIMENTS

Figure 1:
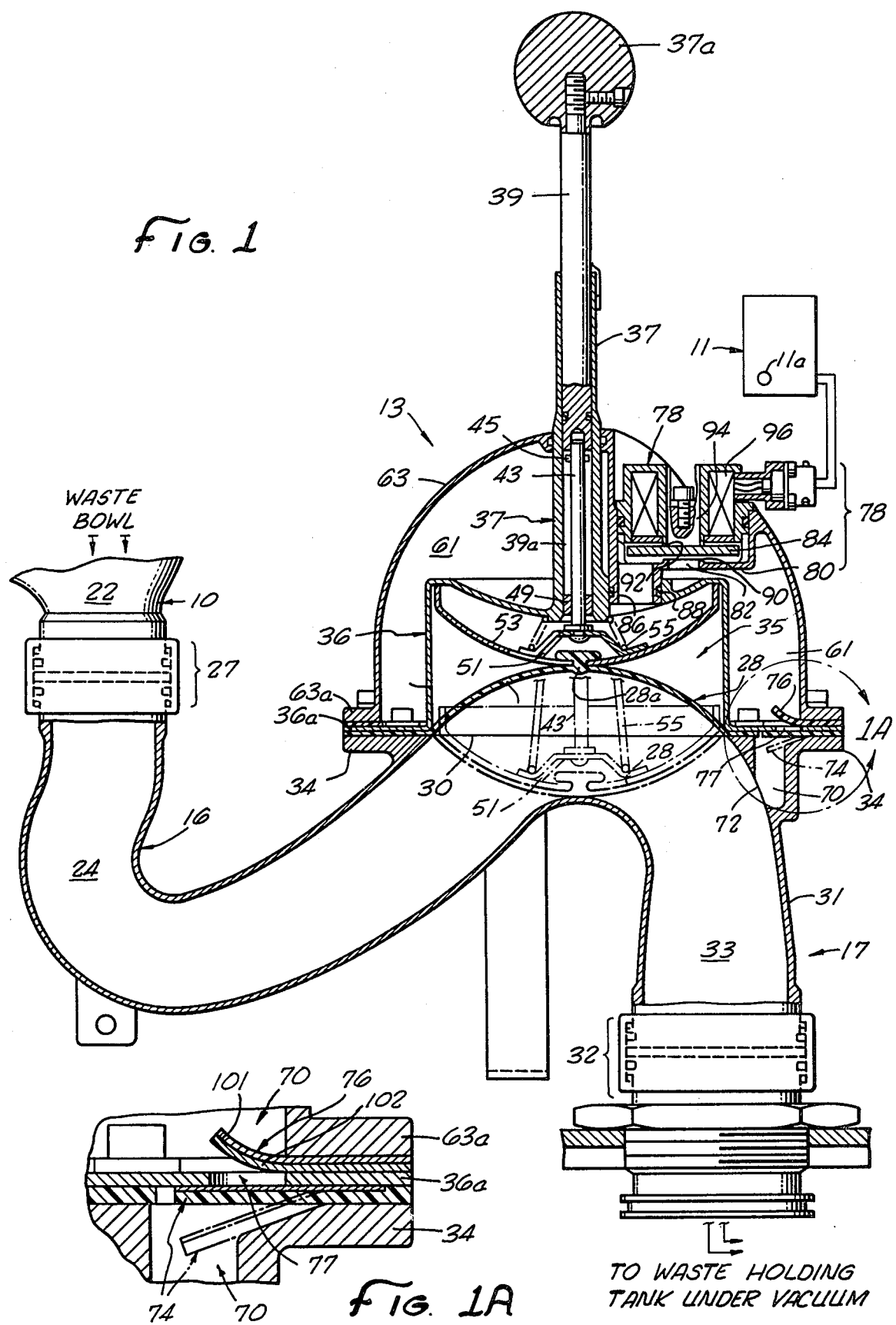
FIG. 1 is an elevational view in cross-sectional detail of a first preferred embodiment of a vacuum-pressure operated valve and vacuum-controlled mechanism constructed in accordance with the present invention.
Figure 2:
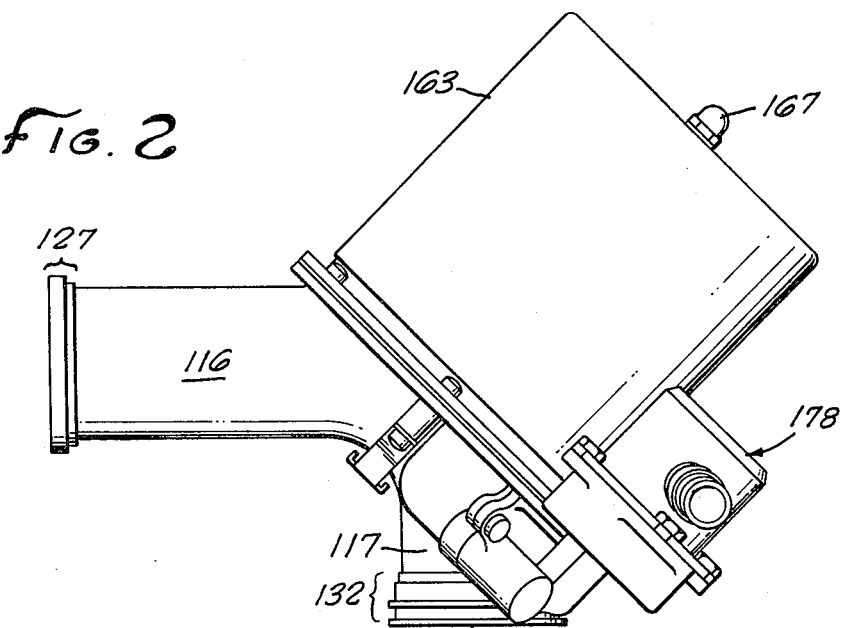
FIG. 2 is a side elevational view of a second embodiment of our invention.
Figure 5:
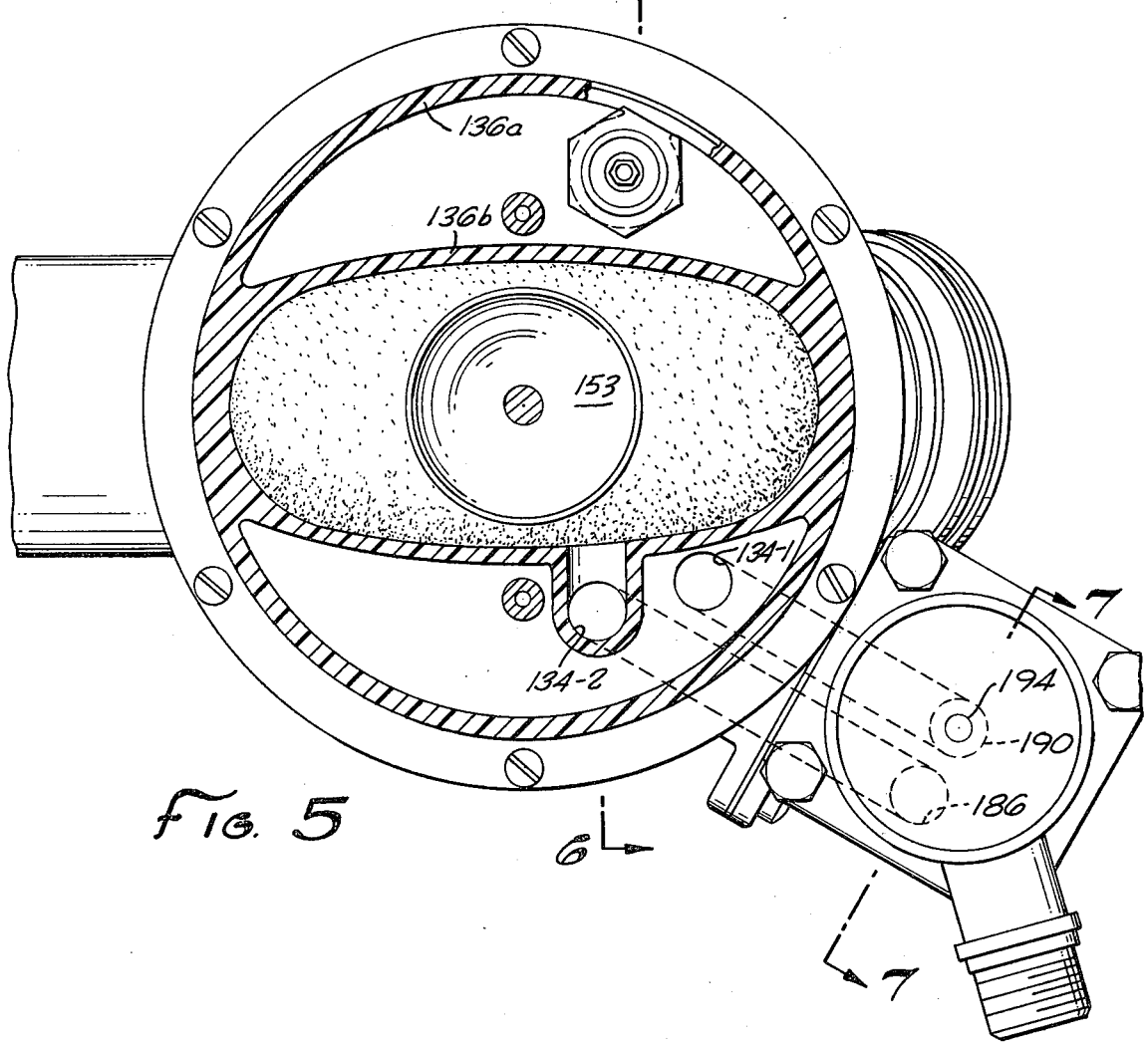
FIG. 5 is a cross-sectional view taken along the lines 5—5 of FIG. 3.
Figure 3:
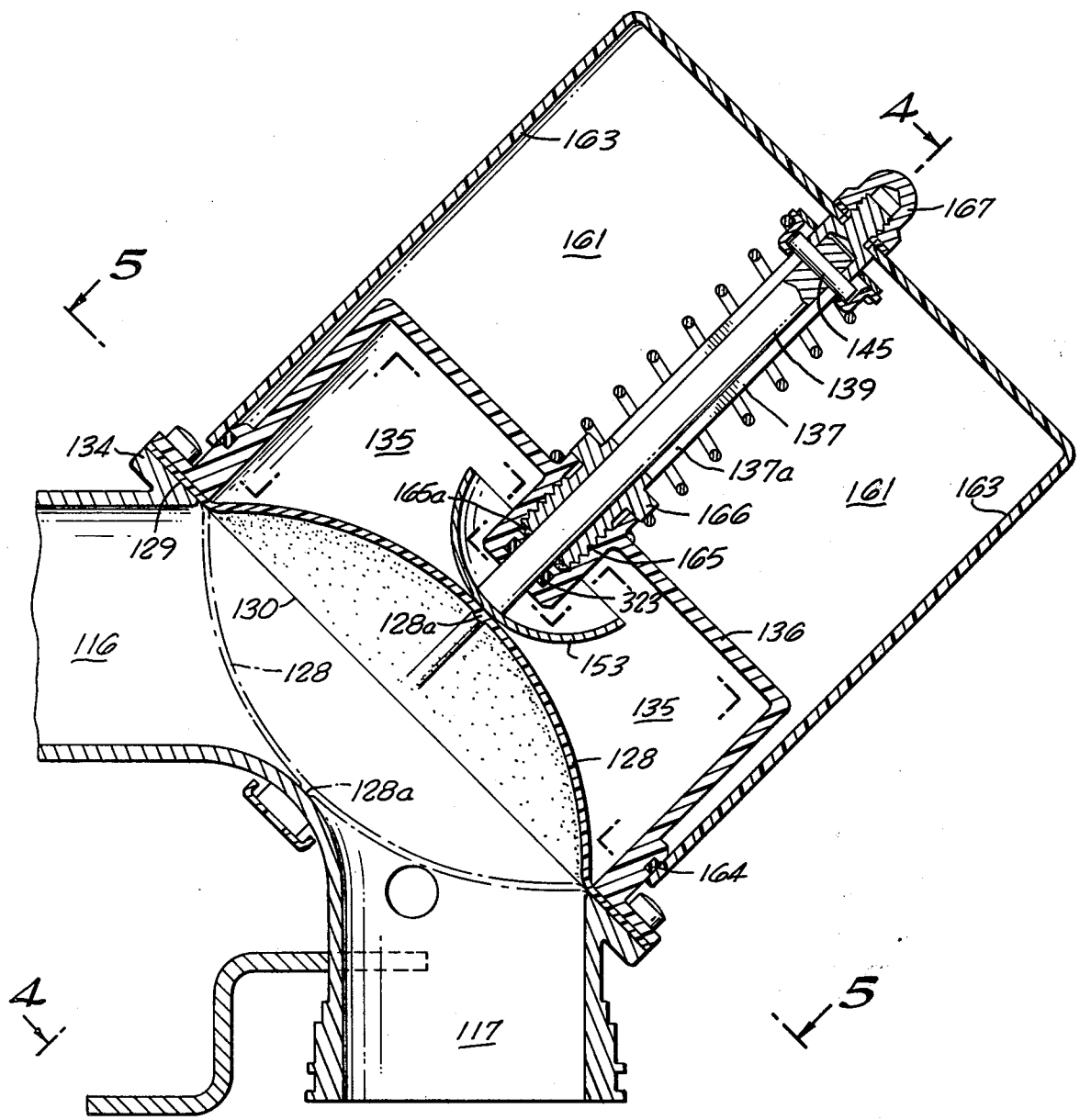
FIG. 3 is an elevational view and cross-section taken through a vertical midplane of the valve of FIG. 2 showing the manual override system in a neutral position.
Figure 4:
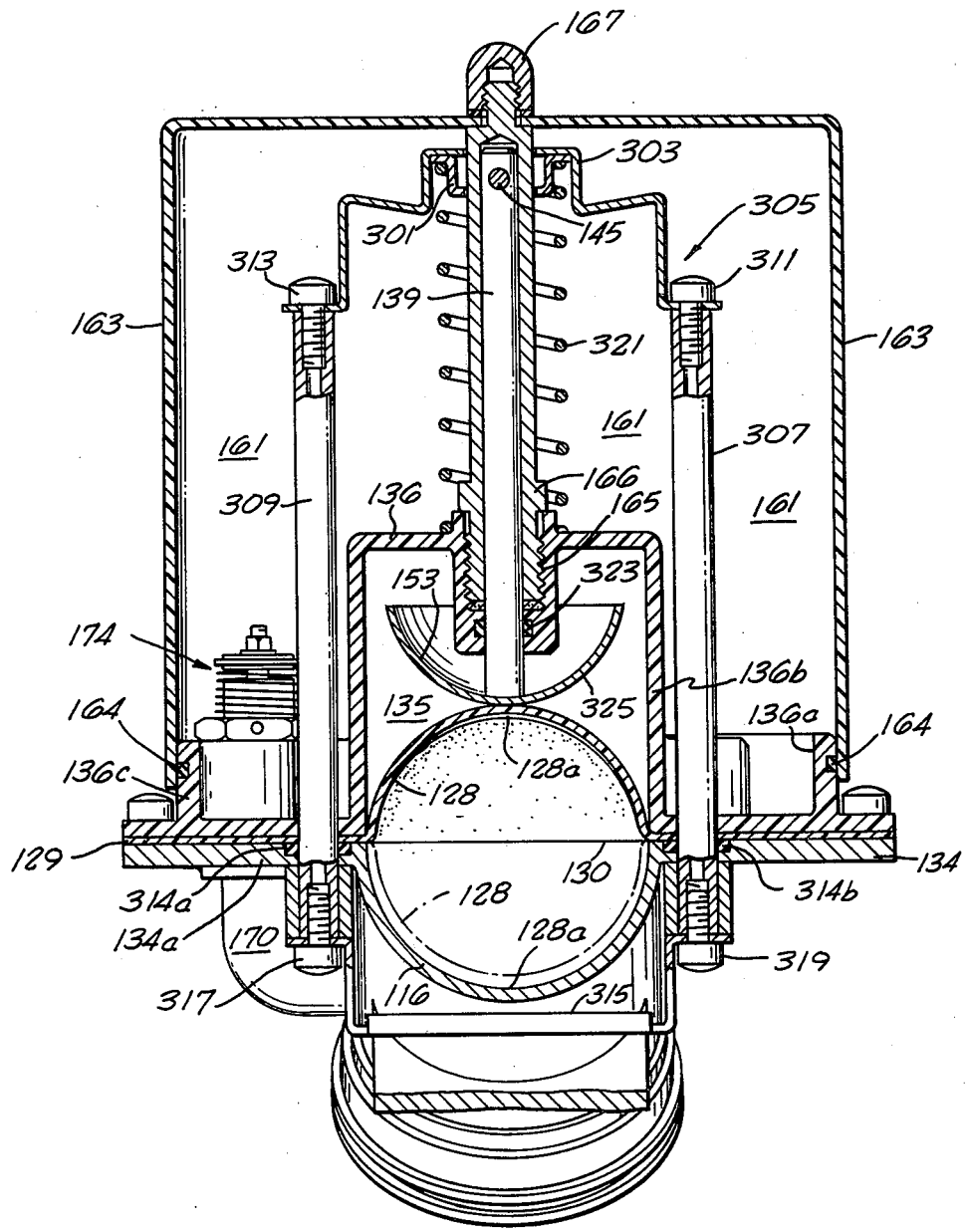
FIG. 4 is a cross-sectional view taken along the lines 4—4 of FIG. 3.
Figure 6:
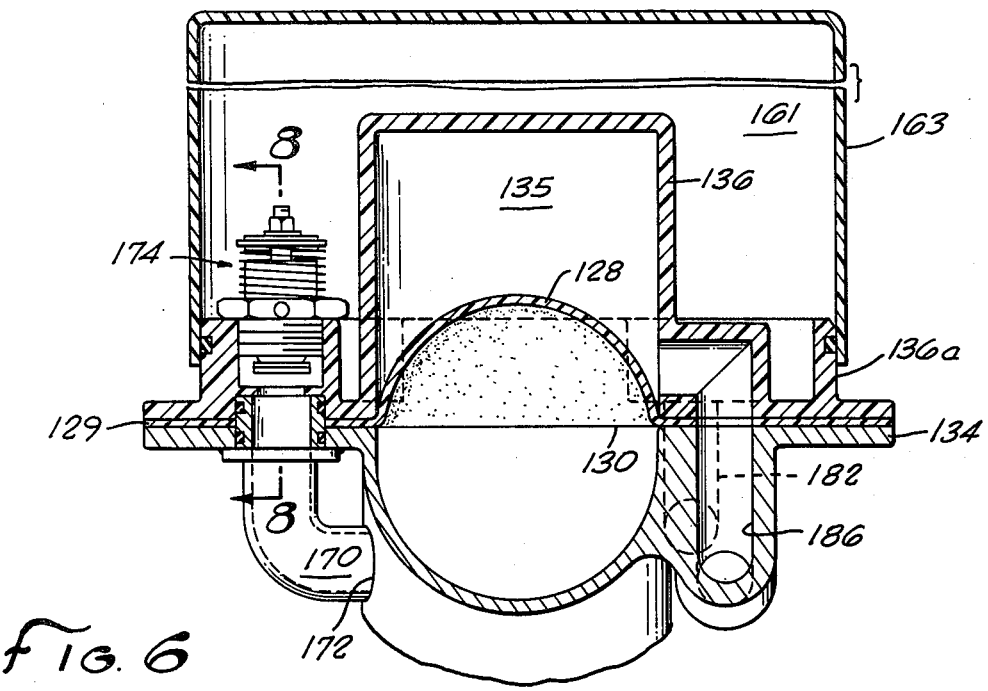
FIG. 6 is a cross-sectional view taken along the lines 6—6 of FIG. 5.

Referring to FIGS. 1 and 1A, a toilet system in which the valve may be used comprises four sub-modules including a bowl module 10 together with a flush water control module (not shown, an electronic control module 11, and a flush valve module 13 having an inlet 16 connected to the bowl module 10 and an outlet or drain 17 connected to a waste holding tank (not shown) maintained under vacuum by a connection to ambient atmosphere when the craft is above a threshold altitude or, alternatively, to a supplemental vacuum pump when the vacuum falls below a preset value at lower altitudes.

An operating button or handle 11a is located convenient to the user for initiating the flush cycle of control module 11 so that the electronic control module 11 puts out a sequence of signals to operate the system including a signal to the flush water bowl supply and a signal to the vacuum flush valve. The electronic control system includes a sensor from which a signal is derived to operatively connect the vacuum pump whenever the vacuum is below a threshold value in the holding tank.

The fresh water module in the electronic control module and further details of their interconnection with the bowl are described in our parent cross-referenced U.S. patent application, Ser. No. 068,131.

The toilet flush valve herein is shown as incorporated in an aircraft waste disposal system employing a bowl having a discharge outlet or drain 22 connected to the inlet 24 of the flush valve by a disconnectable union 27. The flush valve incorporates a major bend which in the embodiment of FIG. 1 is preferably of gooseneck shape. A diaphragm valve member 28 is incorporated across a flanged opening 30 formed across the bend and serves to open and close the valve as will be explained. The other side of the bend extends into an outlet 31 which is connected through a union coupling 32 to the line leading to the waste holding tank, that entire side 33 of the discharge valve and line to the tank being maintained under vacuum.

The flush valve diaphragm 28 serves as means forming a flexible seal or flap and is mounted to extend about the opening of a planar section cut across the bend. A peripheral flange 34 surrounds the opening 30 and is defined by molded structure which may be integrally formed in the valve body or welded up. In general, the diaphragm has an approximately elliptical shape, one dimension conforming to approximately the diameter of the pipe section in which the valve is formed and the longer dimension being related to the length of section opened in the bend thereof. The diaphragm is preferably of molded construction and shape to conform closely to the position of the valve in the closed position as shown in the broken lines 28a in FIG. 1. Thus, the diaphragm element is naturally bistable in either the closed or the open position (shown in full lines). The opening 30 covered by the diaphragm 28A is closed on the side away from the valve pipe section by a first chamber termed hereinafter control chamber 35 formed by a cup 36 having generally elliptical cross-section corresponding to the opening covered by the diaphragm and is further provided with an outwardly extending lip thereabout, for passing over and being sealed to the flange. The upper end of the closure contains an upwardly extending shaft guide 37 through which is supported a handle operated rod 39 which extends downwardly through the guide and is provided at its lower end with an opening in the formed and elongate cross-slot 39a. Interconnected with the rod 39 is a valve engageable shaft 43 carrying a push-pull cross-pin 45 at its upper end, its lower end extending through a bushing 49 into the control chamber 35 whereat it is connected by a spider element 51 to a shaft follower 53 which is shaped in the form of an elliptical dish conforming to the desired position of the diaphragm in the closed position. A compression spring 55 interconnects the wall surrounding the lower end opening of the shaft guide 37 and control chamber cup to the spider and thus to the follower so that a positive urging of the follower and diaphragm into the closed position is obtained. The spider may be connected to the follower by any surface means such as spot welds. It will be noted that the shaft 39 operates by driving the pin 45 and 43 downward, when it is actuated, to push against the spider and follower thereby. The handle does not positively operate in the reverse direction; the spider and dish being free to follow the diaphragm motion.

The diaphragm is normally biased into a closed position by the spring 55.

The control chamber divides the volume for two purposes. The first is to provide an operating volume for movement of the diaphragm and second to provide a separate sealed chamber in which the pressure is changed to move the diaphragm between open and closed positions. The accumulator volume is provided to stabilize a source of vacuum so that the diaphragm can be retained in an open position notwithstanding a partial loss in vacuum occurring downstream side of the valve during the flushing operation.

Means is provided for forming an accumulator chamber 61 and comprises a dome-shaped housing 63 large enough to extend over and encompass the control housing 33. The housing includes a dome-shaped semi-elliptical wall of a shape approximating an ellipsoid of revolution and terminated at its lower end at an outwardly extending planar flange 63a having holes therein in registry with tapered holes (not shown) provided in the flange 34 and diaphragm edge so that the assembly may be clamped together by suitable screws 67 to join the control housing, the accumulator dome and interposed elements of the diaphragm and other members to be described into the structure in which the chambers 31 and 61 are sealed from each other except for passageways to be described. The manual override shaft is terminated at its upper end with a suitable knob 37a and is operable to move the diaphragm valve between open and closed positions by its movement about the length of travel of the inner rod. Thus, the manual override hand and shaft will not move during a normal flush valve function. However, when the manual override is desired, the handle is pulled up and lifted until a bushing 49 engages the cross-pin 45 to lift the inner shaft 43 carrying with it the dish as interconnected through a button 28a formed on the diaphragm, and the diaphragm itself. When the manual override is pushed downward past a spring loaded detent 69 the valve is closed, the pushing action of the follower 53 operating on the diaphragm directly.

Means forming a vacuum passageway 70 extends from a hole 72 provided in the wall of the downstream side of the valve through a check valve 74 and a safety valve 76 located in the flange connection 77 between the several parts and thence through a solenoid operated control valve 78 which interconnects the accumulator volume 61 to the control chamber volume 35.

The bi-directional valve 78 which connects between the accumulator 61 and the control chamber serves to alternately connect the control chamber either to the accumulator or to cabin pressure. Specifically, valve 78 includes a housing 80 having an opening 82 therein connected to the accumulator and is closable by a movable poppet or clapper 84 and is further provided with a laterally extending cylindrical wall 86 which extends downwardly through an opening provided in the control housing and is sealed to the same with an O-ring seal 88. The valve body forms a valve seat at 90 surrounding the opening to the accumulator and further provides a second valve seat 92 opposed to the first valve seat which is in communication with an opening 94 connected to cabin pressure. On one side of the poppet valve and surrounding the second opening 94 is disposed a solenoid 96 which is connected through suitable conductors to the electronic control module 11. The poppet is normally closed by being urged through a suitable spring mechanism (details of which are dotted for clarity) so that the poppet bears against the seat 90 closing the connection between the accumulator and the control chamber while simultaneously opening the control chamber to cabin pressure. In this configuration cabin pressure exerts a downward force on the diaphragm 28 closing the same so that it bears upon the inside wall of and across the bend in the valve by action between the pressure in the control chamber and the vacuum applied from the side of the valve 29 that is connected to the vacuum holding tank. When the solenoid 96 is actuated, the poppet 84 is pulled up to close the magnetic circuit and the accumulator vacuum is applied to the upper surface of the diaphragm through openings 82 and 86 and the cabin pressure connection at 92 is sealed off by the poppet. The vacuum, developed in the control chamber, exerts twice the force by virtue of its area than the force developed in line 29 to urge the diaphragm to separate from the interior wall in the bend of the valve and to proceed towards an open position shown in full lines. At this juncture the vacuum in the bend of the valve tends to equalize and to fall on that side serving as a source to the accumulator through the opening 72.

Means are provided in the form of a check valve 74 for preventing loss of accumulator vacuum. Such means may be a simple flap valve incorporated across the passageway connecting the accumulator to the downstream side of the valve, the same being normally open, but closing upon differential pressure in which the accumulator vacuum exceeds that in the line at 70.

When the solenoid is de-energized, the spring system biases the poppet valve to close the opening 82 and the control chamber is opened to cabin pressure and the passageway 94. At that time the cabin pressure pushes downwardly on the diaphragm to close the valve. In addition, the diaphragm engager is biased closed by compression spring 55 to move the diaphragm into a closed position as indicated by the broken lines 28 to shut off the passageway in the bend of the valve. The diaphragm will normally remain in a closed position until again actuated by a signal applied to the solenoid which will apply vacuum to its upper side.

Many parts of our invention are made from light, plastic-type materials and are not fireproof. If a fire should occur and if parts of the flush valve were destroyed so that the drain passage would be open through the accumulator, this would create air flow within the plane causing the fire to burn or enlarge its area more rapidly. One feature of this invention is to provide means for initially eliminating the possibility of air flow through the exhaust line if the control parts of the toilet system were destroyed.

The gooseneck and portions of the drain are made of metal. The diaphragm valve element 52, and control chamber, however, are formed of a non-metallic material and, therefore, if not protected would be subject to destruction. In our invention we provide a valve engager 53 as shown in FIG. 1 which is metal and when the valve is closed, this metal engager 53 biases the diaphragm shut. In addition to this, as shown in enlarged detail in FIG. 1A, there is a bi-metallic valve 76 having two layers of metal 101 and 102 disposed across the vacuum opening 77 between the accumulator and the vacuum source of line 33. When the bi-metallic valve 76 is heated, it will straighten and move from its curved position into a position to close the opening 77, thus shutting off any flow of air through this opening. In other words, this opening will be closed and, therefore, there cannot be a draft of air flow at this point into the line to the holding tank.

The operation of the valve will now be summarized. Normally the diaphragm is in the lowered position closing the valve. The control chamber is at cabin pressure. The valve 78 closes the connection between the accumulator and the control chamber by action of the spring-biased poppet, the check valve and safety valves are open. The flush cycle is begun when the water supply to the bowl is opened, and the solenoid control valve is actuated to open the poppet, close the source of cabin pressure to the control chamber and open the accumulator connection so that vacuum is applied to the control chamber. The diaphragm begins to open to the differential force across it, i.e., between the vacuum applied to a portion of its area on the drain side (to line 33) trying to close it and the vacuum applied to its entire upper area to open it as well as the pressure available on the bowl side 24 of the bend. Upon opening, the vacuum in the downstream side of the valve at 33 falls. Check valve 74 closes to maintain the accumulator vacuum and the diaphragm continues to open entirely, its movement being accommodated by the space within the control chamber. At the end of the flush cycle, a predetermined time interval of energization of the solenoid, the energizing signal is withdrawn, the solenoid closes, again opening the control chamber to cabin pressure, which closes the valve. The foregoing is exceedingly simple in operation requiring a minimum of moving parts. Further, the solenoid valve operates mechanically independently of the diaphragm itself. The valve has been found very reliable and effective in operation.

Referring now to FIG. 1 the manual override system thereof will be explained in detail. As shown in FIG. 1 the system is shown in solid lines and includes the engager or follower 53 together with the spider which attaches it to the freely movable rod 43. In addition, the spider is connected through compression spring 55 to the inside base of the upper section of the cup 36 of the control chamber which provides a fixed position from which it biases the diaphragm by moving the spider and engager into the same to cause the diaphragm to assume a closed position in which its inside section conforms to the mid-section through the drain at a suitable point, usually the apex of the knee in the drain. As shown, the follower 53, the diaphragm 43, the connecting button 28a, the spider 51, and the control rod 53 all move as a unit and may be in an either upward open position as shown in solid lines in FIG. 1 or in a downward or closed position as shown in broken lines, without regard to the position of the manual override plunger 39. In normal operation the diaphragm is sucked into an upper position shown in solid lines by application of accumulator vacuum to the control chamber to the solenoid valve. The diaphragm is impressed into the lower position by the combined action of the spring 55 and particularly the pressure as applied to the control chamber by operation of the solenoid valve to connect the control chamber to cabin pressure. When the manual override plunger is depressed the pin 45 is engaged thereby pushing the diaphragm manually into a lower position, notwithstanding the pressure situation which obtains in control chamber 35. After being so depressed the manual override system of FIG. 1 is manually returned, but may do so without controlling the position of the diaphragm.

Figure 8:
FIG. 8 is a cross-sectional view taken along lines 8—8 of FIG. 6.
Figure 7:
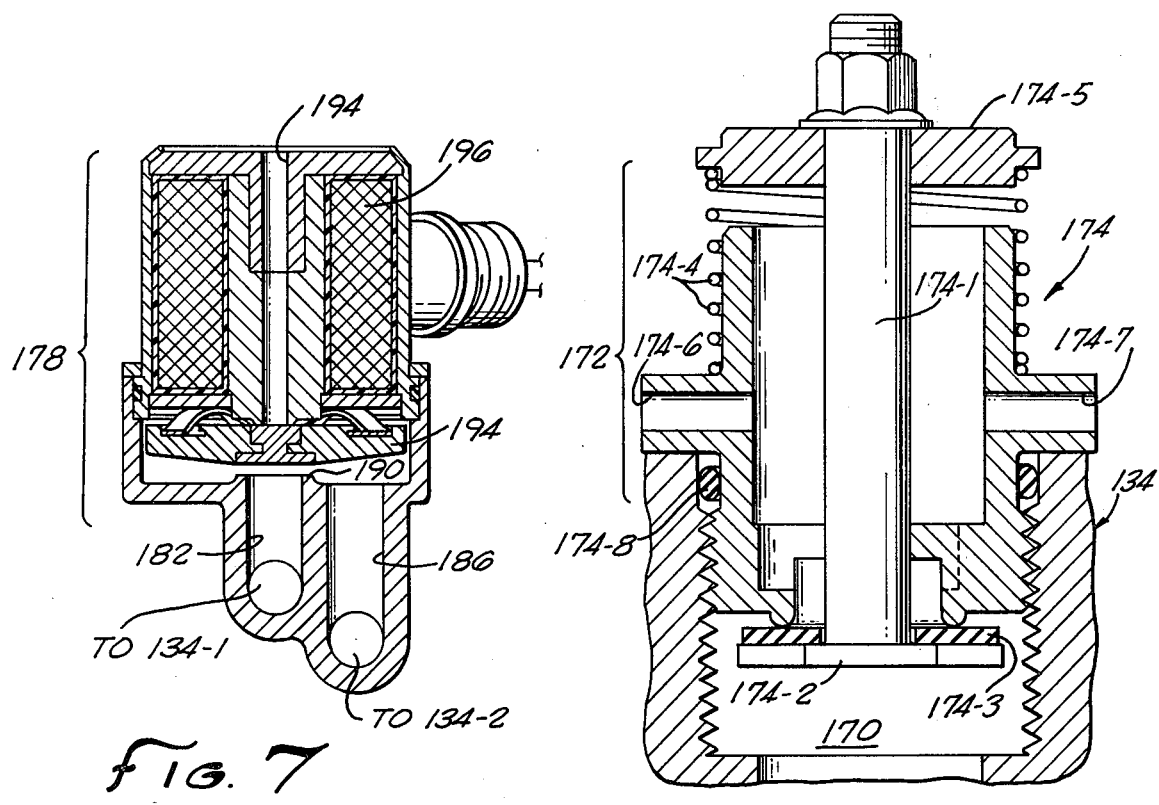
FIG. 7 is a cross-sectional view taken along the lines 7—7 of FIG. 5.
Figure 9:
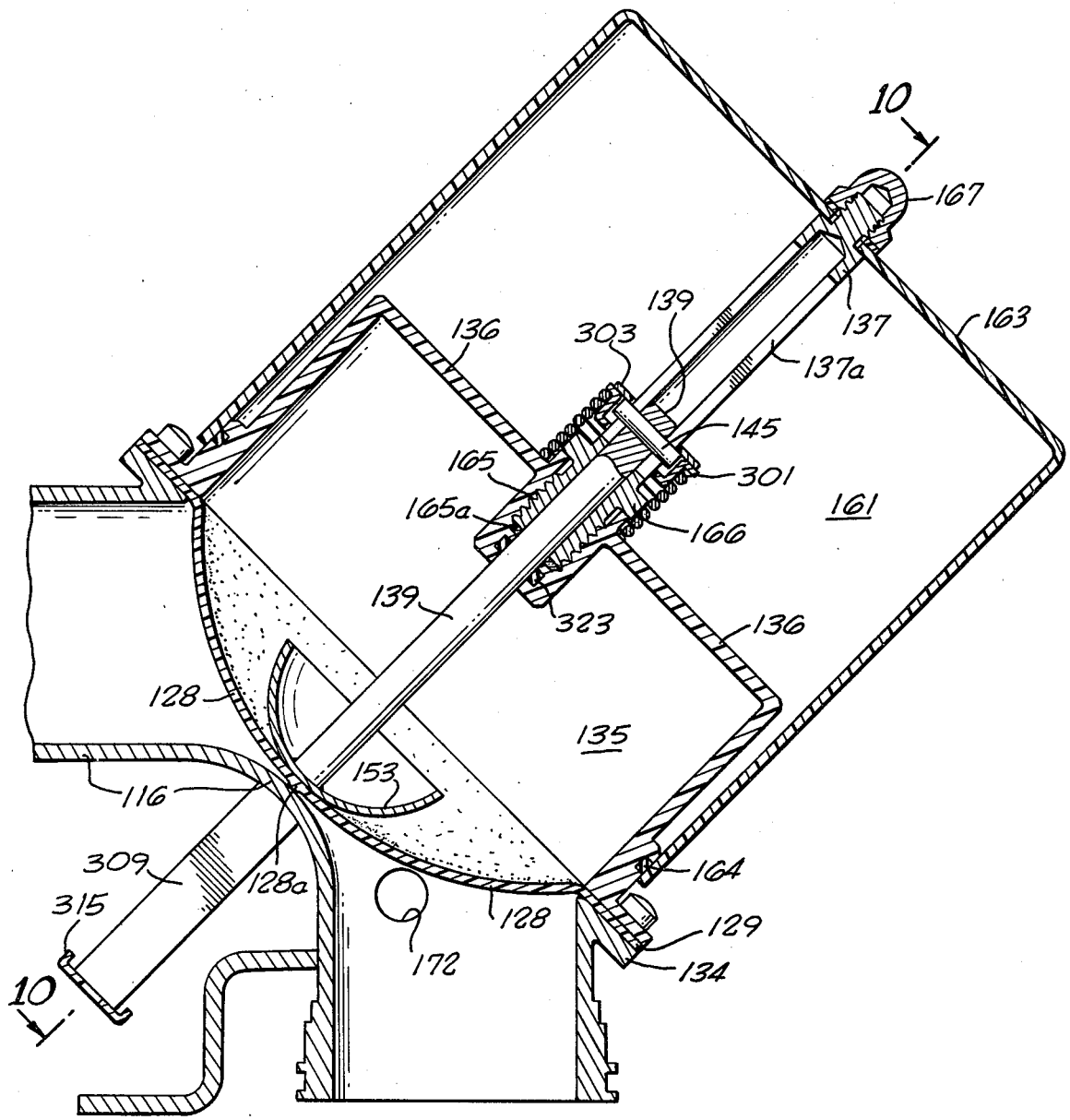
FIG. 9 is a side elevational view and cross-section taken along a vertical midplane of the flush valve of FIG. 2 and showing the manual override system actuated.
Figure 10:
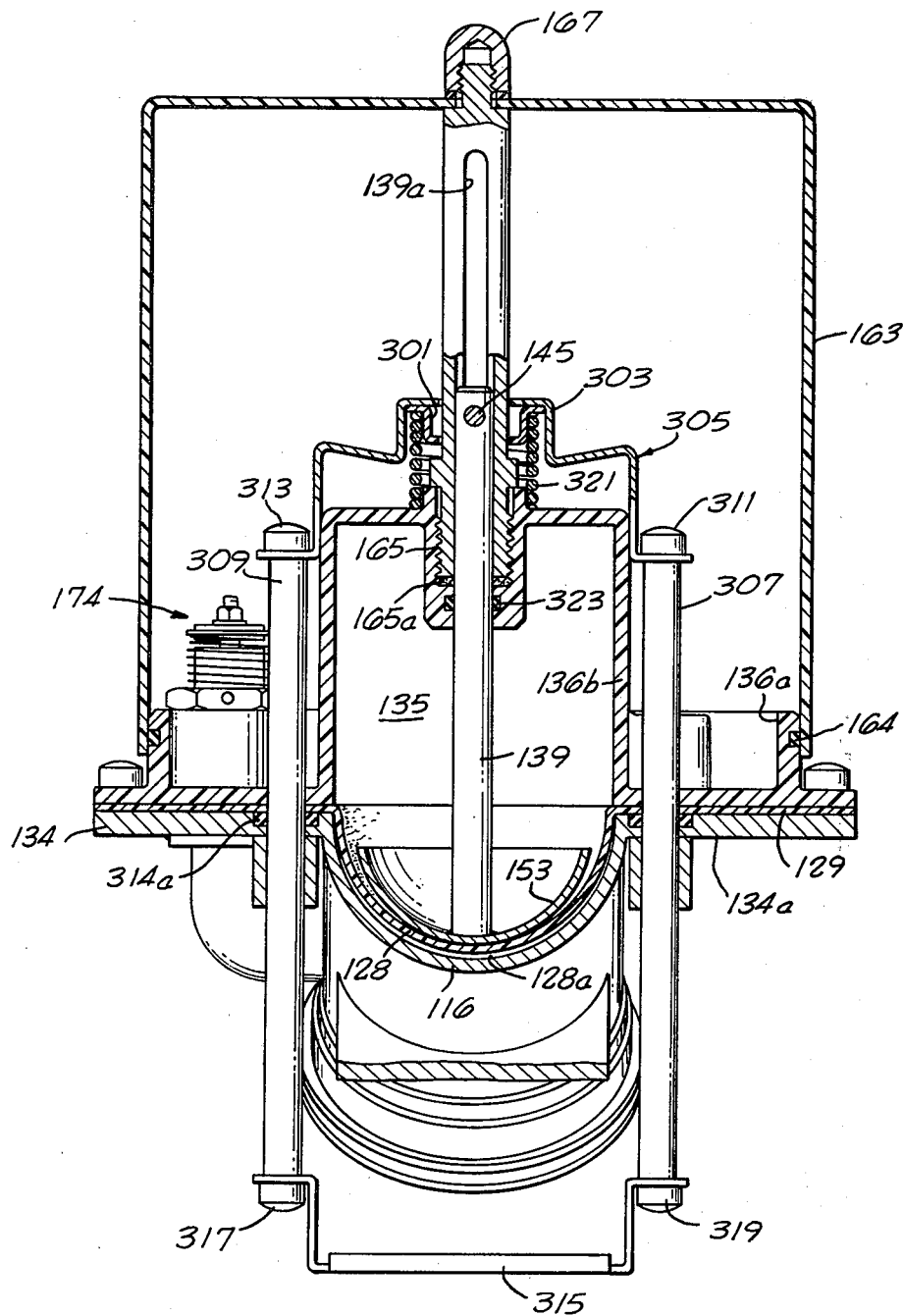
FIG. 10 is a cross-sectional view taken along the lines 10—10 of FIG. 9.

Referring to FIGS. 2–10 there is shown a second improved embodiment of the diaphragm valve constructed in accordance with the present invention and includes a valve body section in the form of a knee of pipe which is shown as connected to the waste bowl and an outlet union 117 connected to a discharge, a portion of which is shown and is connected to the tank holding system maintained under vacuum. Many parts of the embodiment of FIGS. 2–10 correspond closely in function to those of FIG. 1. For this reason, and in order to simplify the description, such corresponding parts will be given the same number as those of FIG. 1 raised by the addition of 100. As opening 130 is formed across the knee of the pipe to form an elliptically-shaped passage which is bounded by an enlarged flange 134 having an inner elliptical ridge or flange 134a continuous with the inner wall of the pipe and extending laterally away therefrom a distance sufficient to form a surface of support for a diaphragm 128 and further extending laterally therefrom to a circular peripheral region 129 to which a circular portion 128a of the diaphragm extends and serves as a gasket. In this way the diaphragm assumes its molded shape in the closed position to provide a stress-free seal for the valve. The backing is formed on the side of the diaphragm away from the drain sealing surface. Preferably, the diaphragm is further provided with an annular ridge 128a thereacross which extends through a semi-circular section from one side of the knee to the other at its most extreme position. The annular ridge 128a provides a sealing bead across a well-defined section of the drain so that when the diaphragm is in its closed and seated position into the drain compression even a slight amount creates an enhanced seal at that location in the bend. Preferably the annular ridge is further given a decreasing taper from the deepest draft of the diaphragm to the edge so that it appears crescent-shaped in section as shown in FIG. 10, the same being an end-view of the knee with the diaphragm in closed position. This crescent shape appears as the gap between the cross-hatched section of the diaphragm and the cross-hatched section of the drain at the apex of the knee and is not cross-hatched in the drawings for clarity.

An upside-down cup-shaped housing 136 fits over the diaphragm and has an inner-elliptical portion 136a constructed to mate with the elliptical flange inner portion of the pipe section and is further provided with an outwardly extending portion 136b which proceeds to the circular flange perimeter. This housing is provided with a peripheral lip which is fastened to the flange by a plurality of screws. The cup is preferably made of a rigid plastic material. Most conveniently, the cup-shaped housing 136 is provided with an outward projection 136c which extends laterally away from the diaphragm a short distance and provides an opening into the interior of the cup, the latter serving as the control chamber 135 into which the diaphragm moves and from which it is actuated in an manner identical to that of FIG. 1.

A second cylindrical cup 163 is provided and extends to surround an outwardly located upward cylindrical projection 136a in the lower portion of the inner control cup to which it is connected by a suitable packing 164. A shaft guide 137 for a manual operating mechanism is innerconnected between the cups, the same being screwed into a threaded opening 165 centrally formed in the first cup and sealed thereto by packing gland 165a and retaining nut 166 formed integrally with the guide and is terminated at its upper end in a threaded fitting which is engaged by a capped nut 167 for holding cup 163 in place. The inner cup 136, the outer cup 163, and interior upper wall 134a of the flange together serve to define an accumulator chamber 161.

Means is provided and mounted externally of the control and accumulator chamber 136, 163 for performing an interconnection therebetween or from the control chamber to cabin pressure. Such means is in the form of a solenoid-actuated valve 178 having a poppet 184 therein biased toward a seat to which it is spring-loaded by a wave washer 185 to close a gas/vacuum passageway 182 extending from an aperture 134-1 formed in the flange wall and opening into the accumulator chamber 161 down through an external passage extension 186 into and through the solenoid valve body. The poppet is of magnetically susceptible material to serve as a magnetic short when the solenoid is actuated, and is provided with a rubber insert to form the seats therein. Thus, when poppet 184 engages the seat 190, the path from the control chamber to the accumulator source is closed, while a path is opened from cabin pressure through passageway 194 and around the poppet valve to the control chamber is opened.

Means are provided for supplying vacuum to the accumulator from a suitable source. Such a source may take the form of an independent vacuum pump but is preferably provided in the system itself in view of the availability of vacuum at the vacuum-holding tank and the side of the drain connected thereto. For this purpose the neck 170 is connected through the side wall of the drain on the downstream side of the diaphragm closure and is connected through a spring loaded check valve 174 of the poppet and stem type mounted in the flange 134.

FIG. 8 illustrates the construction of the poppet valve which includes a stem 174-a having a poppet head 174-2 on one end with an upward facing seat of elastomeric material is biased towards the valve seat by a concentric spring 174-4 disposed between a valve retainer 174-5 connected at the opposite end of the stem and the upper wall of the check valve body 174 which is threaded for screwing the same into the flange 134. Lateral orifices 174-6, 174-7 are provided for communication between the interior of the valve and the accumulator chamber 161. An "O" ring seal 174-8 is provided to assure an absence of leakage. Whenever the drain vacuum pressure falls below that of the accumulator the check valve opens to lower the accumulator pressure accordingly. Whenever the drainside pressure in line 170 increases, due, for example, to the diaphragm being opened with a consequent rise in pressure, the check valve automatically closes due to the combined action of the spring urging the same towards a closed position and the air movement which has attempted to take place from the drain to the accumulator. The function of this form of construction of the check valve is the same as that of the valve 74 of FIG. 1.

Referring particularly now to FIGS. 9 and 10, the manual override system of the second embodiment of the invention will be explained in detail. Thus, as shown the system comprises a push rod or shaft 139 which is set for movement in the shaft guide 137 and is provided with a cross-pin 145 at its upper end which extends through a lateral slot 139a in the guide. A spring retainer cup 301 at its upper end is closed by the crosspiece 303 of a yoke assembly 305 (best seen in FIG. 4) to capture the pin 145. The yoke assembly 305 includes a pair of spaced-apart yoke members 307, 309 inner-connected to the retainer cross-piece by suitable screws 311, 313, the yokes extending downwardly in spaced parallel alignment through yoke seals 314a,b incorporated in the drain flange wall. The yokes 307, 309 extend into the free space below the drain and are interconnected by handle 315 attached with screws 317,319. When the handle is pulled downward, the yoke crosspiece 303 pushes downward into contact with the pin driving the plunger shaft downwardly against the return force of a spring 321 mounted thereabout between the retaining cup 301, upon which it bears and the upper end of the wall of the control chamber cup 136.

The lower end of the plunger shaft 139 extends through a seal 323 and is connected at its lower end, as by welding, to a suitably shaped follower 153 adapted for engaging the diaphragm and fully positioning it into a closed position. The closed position is shown in detail in FIGS. 9 and 10. From this position, when the handle is no longer being pulled, the entire yoke assembly is urged upwardly by spring 321 taking the pin shaft, and follower with it. Thus, in normal operation, without the manual override, there is never any connection between the follower and the diaphragm, such connection being made solely by way of manual operation of the override device. As shown in FIG. 10 the follower is in the shape of a spherical shell, which has a radius slightly less than that of the inside radius of the flange so that a broad area of positive contact is made with the diaphragm providing a good seal at the deepest draft where it engages the bead into compression against the drain wall.

In summary, the manual override of FIGS. 2 through 10 is exceedingly simple. In general, the override system is disconnected completely from the operation of the diaphragm except during the manual operation, at which time the yoke assembly 305 drives the pin 145 and plunger shaft 139 and follower 325 down into engagement with the diaphragm as shown in FIGS. 9 and 10. Upon release of the manual override the spring 321 returns the assembly 305 and follower 153 away from the diaphragm 128 which is then free to assume whatever position is called for by either pressure or vacuum being applied to the control chamber 135.

We claim:
1. A valve of a design suitable for incorporating into a drain including:
 a. a flexible diaphragm movable between a closed position within said drain to seal the same shut, whereby vacuum is isolated downstream of the diaphragm and cabin pressure is equalized upstream of said diaphragm and an open position out of said drain line so that the vacuum is applied through said valve and to said bowl to remove the waste therein and flushing liquid therefrom,
 b. means forming a vacuum/pressure operated control chamber sealed across said diaphragm on the side opposite said drain for opening the diaphragm and flush valve by applying vacuum to said side and for closing said valve by applying pressure to said opposite side,
 c. a source of vacuum for operating said control chamber, and
 d. valve means for normally connecting said control chamber to cabin pressure so that the valve is closed across the drain by the combined action of cabin pressure on that opposite side of said diaphragm and vacuum applied to the downstream side of the diaphragm across the drain, and for intermittently connecting the control chamber to said source of vacuum to cause the diaphragm to said source of vacuum to cause the diaphragm to be pulled into an open position out of the drain.

2. A valve as in claim 1 in which the source of vacuum comprises a vacuum accumulator connected to said valve means, check valve means connecting to the accumulator to said drain as a source of vacuum and responsive to pressure drop in said drain to close whereby said accumulator is kept at a vacuum to operate said valve diaphragm.

3. The flush valve as in claim 2 wherein said check valve is mounted into the flange connection between said diaphragm and accumulator and in which said check valve comprises a normally closed spring-loaded poppet valve constructed and arranged to open whenever the pressure in the drain is below the pressure in the accumulator.

4. A valve as in claim 1 wherein said control valve is a two-way valve, a means for biasing the same in a predetermined, normally closed position, means connecting the normally closed line through said valve between the accumulator and the control chamber, piping means connecting the normally open side from said control chamber to cabin pressure.

5. A valve as in claim 4 wherein said control valve includes a poppet valve and an electrical solenoid and in which the poppet is moved by closing a magnetic gap in the solenoid circuit by means of an electrical energizing signal, and further including spring means biasing said poppet into a normally closed position closing the accumulator to control chamber piping means.

6. The valve as in claim 5 in which the spring means is a wave spring of generally circular conformation and having upper and lower extremes thereof lying in spaced parallel planes, and further including fingers extending from the wave spring and one of said planes for engaging said poppet.

7. A valve as in claim 1 in which said diaphragm is constructed of a layer of flexible woven backing impregnated with an elastomer and molded into a stable shape corresponding to the closed position of said diaphragm in said valve, said backing being positioned on the side of said diaphragm away from the drain.

8. A valve as in claim 7 further in which a diaphragm is provided with an annular ridge thereacross extending across a semi-circular section from one side of the drain to the other to provide a sealing bead across a defined section of said drain.

9. A valve as in claim 8 in which said annular ridge is formed with a taper decreasing from deepest draft of the diaphragm to the edge so as to appear crescent-shaped in end view.

10. A valve as in claim 1 further including means for biasing the valve towards a closed position comprising a diaphragm engaging follower, means for mounting said follower for movement towards the diaphragm from a position towards said control chamber, such follower having a shape including a section thereof conforming to the mid-section through the diaphragm in a closed position so that when impressed against the diaphragm said diaphragm is mechanically compressed into a seal against the opposite side of the drain.

11. A valve as in claim 10 in which said follower is a spherical cup having a radius approximately equal to or slightly less than that of the diaphragm midsection and across the apex of said drain.

12. A valve as in claim 10 in which said biasing means includes a compression spring normally urging said follower into engagement to close towards said diaphragm with moderate force.

13. A valve as in claim 12 in which said means for biasing said disphragm comprises a manual override plunger assembly having a one way drive actuatable by hand and further provided with a spring return mechanism for returning the plunger assembly to a released position.

14. A valve as in claim 13 in which said spring return is connected to said plunger by a slide link so that the follower may remain biased into a position against said diaphragm while said manual override mechanism is returned.

15. A valve as in claim 10 in which said means for mounting said follower comprises a button formed in said diaphragm and interconnected to the follower.

16. A valve as in claim 10 in which said means for mounting said follower comprises said plunger shaft, and means positively interconnecting said plunger shaft and said follower.

17. In a valve of the class described, a combination of:
 a. a valve body having a flow passage therethrough, there being a side openings in said valve body,
 b. a flexible valve element being secured to said body and extending across said side opening, said valve element being movable between closed and open positions,
 c. walls forming a control chamber adjacent to said side opening, said valve element forming one wall of said control chamber, the outer side of said valve element being subjected to whatever pressure exists in said control chamber,
 d. inlet and outlet means for said control chamber, and
 e. operating means for communicating said inlet and outlet means to a source of pressure or a source of vacuum whereby said valve element is moved into open or closed position depending upon whether said control chamber has a pressure or a vacuum therein.

18. A valve of the class described adapted to be connected in a vacuum line, the combination including:
 (a) a vacuum actuated means for opening said valve,
 (b) a vacuum connection between said vacuum actuated means and said vacuum line on the downside of said valve,
 (c) a vacuum accumulator in said vacuum connection,
 (d) a check valve in said vacuum connection between said vacuum accumulator and said vacuum line for preventing a reverse flow through said vacuum connection to prevent a loss of vacuum to said vacuum line when the vacuum in said vacuum line is reduced by the opening of said valve, and
 (e) means for disconnecting said vacuum connection from said vacuum line and supplying pressure to said control chamber.

19. In a vacuum-pressure operated valve of the class described, the combination of:
 (a) A flexible valve element movable between open and closed position, whereby said valve may be opened or closed,
 (b) a control pressure chamber adjacent said valve element, said valve element including a movable wall exposed directly to the pressure or vacuum within said control pressure chamber, said valve element being moved or held open or closed depending upon whether or not there is a pressure or a vacuum in said control pressure chamber, and
 (c) an operating means whereby a vacuum or a pressure may be applied to said control chamber whereby pressure may be applied to said valve element to close same or vacuum can be applied to said valve element to open the same.

* * * * *